United States Patent [19]
Marechal

[11] Patent Number: 5,531,404
[45] Date of Patent: Jul. 2, 1996

[54] UNDERFRAME FOR A PASSENGER AIRCRAFT SEAT, AND A SEAT INCLUDING SUCH AN UNDERFRAME

[75] Inventor: Robert R. Marechal, Paris, France

[73] Assignee: Societe Industrielle et Commerciale de Materiel Aeronautique, Issoudun, France

[21] Appl. No.: 237,396

[22] Filed: May 3, 1994

[30] Foreign Application Priority Data

May 14, 1993 [FR] France ................................. 93 05866

[51] Int. Cl.⁶ .......................... B64D 25/02; B64D 25/04; B60N 2/42; B60R 21/00
[52] U.S. Cl. ................................... 244/118.6; 244/122 R; 248/503.1; 297/216.1; 296/68.1
[58] Field of Search ........................... 244/118.1, 118.6, 244/122 R, 118.5; 248/501, 503, 503.1; 297/216.1, 216.11, 216.2; 296/68.1

[56] References Cited

U.S. PATENT DOCUMENTS

| | | | |
|---|---|---|---|
| 4,375,300 | 3/1983 | Long et al. | 244/122 R |
| 4,688,662 | 8/1987 | Correll | 297/216.1 |
| 4,718,719 | 1/1988 | Brennan | 297/216.1 |
| 4,861,103 | 8/1989 | Vallee | 297/216.1 |
| 4,911,381 | 3/1990 | Cannon et al. | 244/122 K |
| 5,224,755 | 7/1993 | Beroth | 297/216.1 |
| 5,310,030 | 5/1994 | Kawakita et al. | 297/216.1 |
| 5,409,186 | 4/1995 | Chow | 244/122 R |

FOREIGN PATENT DOCUMENTS

| | | | |
|---|---|---|---|
| 2684955 | 6/1993 | France | 244/122 R |
| 2250431 | 6/1992 | United Kingdom | 244/122 R |

*Primary Examiner*—Andres Kashnikow
*Assistant Examiner*—Virna Lissi Mojica
*Attorney, Agent, or Firm*—Young & Thompson

[57] ABSTRACT

The invention relates to an underframe for a passenger aircraft seat, the underframe including a triangular base defining a front anchor point and a rear anchor point, and a raised intermediate vertex; and a leg associated via its top end with the structure of the seat and via its bottom end with the triangular base. In accordance with the invention, the leg is associated rigidly with the base by rigid association means which, during normal use of the seat, hold the leg positively relative to the base, in particular so as to prevent any forward or backward pivoting of the leg.

20 Claims, 3 Drawing Sheets

UNDERFRAME FOR A PASSENGER AIRCRAFT SEAT, AND A SEAT INCLUDING SUCH AN UNDERFRAME

FIELD OF THE INVENTION

The invention relates to an underframe for use in a passenger aircraft (in particular an air liner), the seat underframe being of the type comprising firstly a triangular base defining a front anchor point, a rear anchor point, and a raised intermediate vertex, and secondly a leg (which is generally a rear leg) associated via its top end with the structure of the seat, in general with the seat proper, and associated via its bottom end with the triangular base, in general with the vertex of the base.

BACKGROUND OF THE INVENTION

American U.S. Pat. No. 4,911,381 discloses such a seat underframe. That document is incorporated with reference to the present description, with only the characteristics that are specific to the invention being described in detail.

Such known seat underframes offer the advantage of procuring improved behavior in the event that they are subjected to very large amounts of deceleration, e.g. due to a crash. The energy absorption device connects the top of the front leg to the vertex of the triangular base so as to maintain the relative positions of the legs under conditions of normal use, while permitting relative motion generating energy absorption in the event of a violent impact.

Nevertheless, in such known seat underframes, it is not easy to adapt the value of the trip threshold, above which the energy absorber device is tripped, as a function of the use that is to be made of the underframe (weight of the seat to be supported, number of seats, position of the underframe relative to the floor of the aircraft and to the other seats, etc.).

The energy absorption devices that are in general use have standard characteristics which cannot be modified in order to choose the quantity of energy that can be absorbed from a wide range of values and with accuracy.

In addition, an underframe made in that way is heavy and requires a large number of parts that must be manufactured and assembled. More particularly, if the characteristics of the energy absorption device are to be modified, the following must be modified accordingly: the dimensions, the relative positions, and the various constituent parts of the underframe. The anchor points, the longitudinal dimensions and the overall size of the energy absorption device are generally modified as a function of the value of the energy to be absorbed. In this way, it is necessary to design a specific underframe as a function of almost each energy absorption device used.

OBJECTS AND SUMMARY OF THE INVENTION

An object of the invention is to mitigate those drawbacks by providing a seat underframe whose energy absorption capacity can be modified and adapted easily, quickly, and cheaply to the conditions under which the underframe is to be used. More particularly, an object of the invention is to provide such a seat underframe in which it is possible to make such a modification without modifying the relative positions, the shapes, and the dimensions of the constituent parts of the underframe itself.

Another object of the invention is to provide a seat underframe which offers the same advantages as the above-mentioned known underframes, but which is lighter, and particularly simple to manufacture and to install.

Another object of the invention is to provide such a seat underframe which absorbs energy on impact, with an pivot angle through which the front leg pivots being limited to a maximum predetermined value.

Another object of the invention is to provide such a seat underframe which is capable of satisfying the dynamic "16 g type" tests that are imposed by international civil aviation standards, or stricter tests.

To these ends, the invention provides an underframe for a passenger aircraft seat, the underframe including a triangular base defining a front anchor point and a rear anchor point, and a raised intermediate vertex; and a leg associated via its top end with the structure of the seat and via its bottom end with the triangular base; wherein the leg is associated rigidly with the base by rigid association means which, during normal use of the seat (i.e. in the absence of deceleration that is sufficient to trip energy absorption), hold the leg positively relative to the base, in particular so as to prevent any forward or backward pivoting of the leg.

In this way, in a seat underframe of the invention, the energy absorption function is separated from the function of maintaining the overall shape of the underframe during normal use. Unlike the prior art, in which the energy absorption device is used both to maintain in position the various constituent parts of the underframe that are in general hinged together and/or to the structure of the seat, and also to absorb energy in the presence of large amounts of deceleration.

In accordance with the invention, the rigid association means for rigidly associating the leg with the base include energy absorption means which are active when the seat is subjected to deceleration above a predetermined value tending to cause the leg to pivot forwards. The energy absorption means include at least one plastically deformable portion of the leg and/or of the base, in particular a plastically deformable portion of the bottom end of the leg. More particularly, the energy absorption means include an energy absorption device for absorbing energy by buckling, the device being formed of at least one portion of the leg and/or of the base.

Furthermore, in accordance with the invention, the energy absorption means include an additional energy absorption device attached to, and interposed between the leg and the base. The additional energy absorption device is attached at the rear and in the vicinity of the bottom end of the leg. The additional energy absorption device includes a male part that penetrates by force and with plastic deformation into an aperture in a female part; the female part or the male part is directly attached to and associated with the leg; and the other part, i.e. the male part or the female part, is directly attached to and associated with the base. The aperture includes an end forming an end-of-stroke abutment for the male part limiting the amplitude of the movement of the leg relative to the base. The female part may be constituted merely by a plate made of a material having a high modulus of elasticity, in particular steel.

The invention also provides a seat underframe including a combination of all or some of the characteristics mentioned above or below.

BRIEF DESCRIPTION OF THE DRAWINGS

Other characteristics and advantages will appear on reading the following description given with reference to the accompanying drawings, in which.

MORE DETAILED DESCRIPTION

Figure 1:
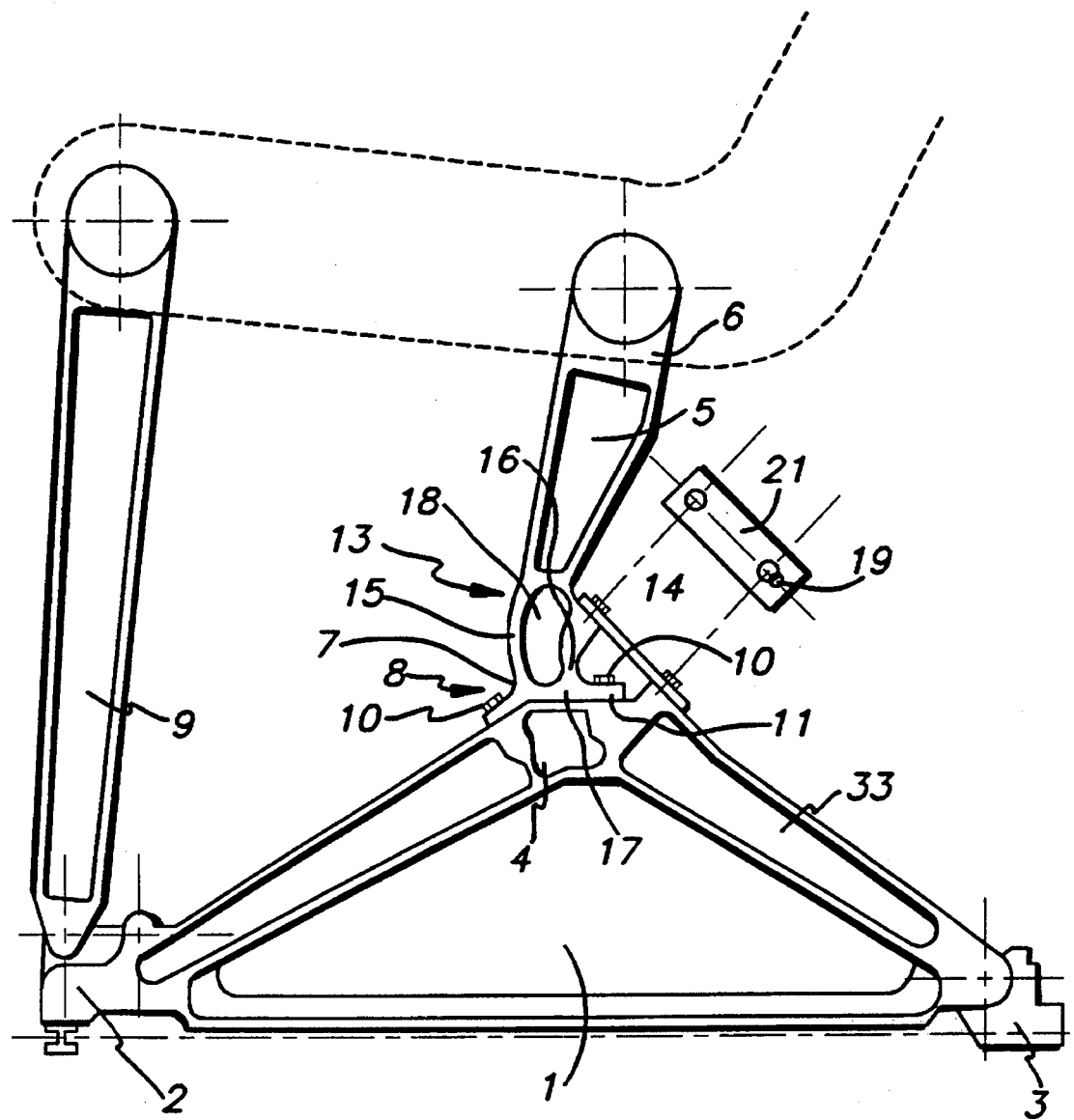
FIG. 1 is a diagrammatic side view of a seat underframe of the invention in the normal use position.

The invention concerns an underframe for a passenger aircraft seat, the underframe including a triangular base 1 defining a front anchor point 2, a rear anchor point 3, and a raised intermediate vertex 4, and a leg 5 having its top end 6 associated with and hinged to the structure of the seat (shown in dot-dashed lines in FIG. 1), and its bottom end 7 associated with the triangular base 1.

The general characteristics of such a seat underframe are disclosed in American U.S. Pat. No. 4,911,381 incorporated with reference to the present description.

In accordance with the invention, the leg 5 is associated rigidly with the base 1 by rigid association means 8 which, during normal use of the seat, hold the leg 5 positively relative to the base 1, in particular so as to prevent any forward or backward pivoting of the leg 5. In general, and in the embodiment shown, the leg 5 is the rear leg, and a front leg 9 extends from the front anchor point 2.

The leg 5 is associated rigidly with the base 1 in that it is normally carried and held relative to the base 1 once it is connected to the base 1. In this way the leg 5 may be attached to the base 1 by rigid association means 8, comprising screws 10 clamping a flange 11 situated in the vicinity of the bottom end 7 of the leg 5 by engaging in tapped holes 12 in the vertex 4, as shown.

Nevertheless, in a variant (not shown), the leg 5 may be formed in one piece with the base 1. Other modes of rigidly associating the leg 5 with the base 1 are possible. Preferably and in accordance with the invention, the leg 5 is in general associated with the base 1 at least substantially in the vicinity of the raised intermediate vertex 4.

In accordance with the invention, the rigid association means 8 for rigidly associating the leg 5 with the base 1 include energy absorption means 13, 14 which are active when the seat is subjected to deceleration above a predetermined value tending to cause the leg 5 to pivot forwards. The energy absorption means 13, 14 include an energy absorption device 13 that absorbs energy by means of at least one portion 15, 16 of the leg 5 and/or of the base 1 buckling. The energy absorption means 13, 14 further include an additional energy absorption device 14 attached to, associated with and interposed between the leg 5 and the base 1.

In accordance with the invention, the energy absorption means 13, 14 therefore include at least one plastically deformable portion 15, 16 of the leg 5 and/or of the base 1, which portion is plastically deformable above a predetermined deceleration value, and more particularly at least one plastically deformable portion 15, 16 of the bottom end 7 of the leg 5. The plastically deformable portions 15, 16 constitute the energy absorption device 13 which absorbs energy by buckling.

And more precisely, the energy absorption means 13, 14 include a rear portion 16 that is plastically deformable by bending, and a front portion 15 that is deformable by buckling, when the leg 5 is caused to pivot forwards from its normal use position under the effect of deceleration above a predetermined value.

The front portion 15 is constituted by a forwardly-convex member 15. The rear portion 16 is also constituted by a forwardly-convex member 16. But the rear portion 16 is provided with a narrow segment 17 that is plastically deformable by bending, and that forms a transverse horizontal pivot axis about which the leg 5 pivots relative to the base 1 when said predetermined deceleration value is exceeded.

To form the front and rear portions 15, 16 constituting an energy absorption device 13 for absorbing energy by buckling in the seat underframe of the invention, the leg 5 and/or the base 1 is provided with a transverse window 18 at least in the vicinity of the association between the leg 5 and the base 1. In this way, the convex portions 15, 16 constitute weakened portions of the leg 5 and/or of the base 1, which portions are normally rigid and conserve their characteristic shapes, but, under the effect of deceleration exceeding said predetermined value, said portions become plastically deformed respectively by buckling and by bending, thereby absorbing energy. The curved front convex portion 15 is deformed by buckling outwards and forwards, the radius of curvature of the convex portion decreasing during buckling. The rear portion 16 forming the narrow segment 17 undergoes forward bending in the plastic domain. In the embodiment shown in FIGS. 1 and 2, the window 18 and the portions 15 and 16 are provided in the bottom portion 7 of the leg 5 immediately above the vertex 4 of the base 1. The window 18 is at least substantially kidney-shaped and it passes through the leg 5. FIG. 2 shows the deformed appearance of the energy absorption device 13 for absorbing energy by buckling, which device is constituted by the window 18 and by the front and rear portions 15, 16. The window 18 and the front and rear portions 15, 16 are disposed immediately above the flange 11 for fixing the bottom end 7 of the leg 5 to the base 1.

An additional energy absorption device 14 is attached to, associated with and interposed between the leg 5 and the base 1 at the rear and in the vicinity of the bottom end 7 of the leg 5. The additional energy absorption device 14 makes it possible to supplement the above-described device 13 and to adapt the energy absorption capacity of the energy absorption means 13, 14 of the seat underframe of the invention simply and cheaply. The additional energy absorption device 14 includes a male part 19 that penetrates by force and with plastic deformation into an aperture 20 in a female part 21. The female part 21 or the male part is directly attached to and associated with the leg 5, while the other part, i.e. the male part 19 or the female part, is directly attached to and associated with the base 1. Each of the male and female parts 19, 21 is thus associated and in contact with either the base 1 or the leg 5, without any intermediate link element.

In accordance with the invention, the male part 19 has an overall external shape that is circularly cylindrical, and the aperture 20 is constituted by an oblong slot forming two facing abutment surfaces 22a, 22b radially extending a cylindrical bore 23 in which the male part 19 is normally (i.e. in the normal use position) engaged. In the normal use position, the axis of the male part 19 coincides with the axis of the bore 23 and is parallel to the abutment surfaces 22a, 22b. The outside diameter $\underline{d}$ of the male part 19 is greater than the width $\underline{e}$ of the oblong slot forming the aperture 20, i.e. greater than the distance between the two parallel abutment surfaces 22a, 22b so that, in action, i.e. when deceleration exceeds said predetermined value, the energy absorption device 14 absorbs energy by means of plastic deformation of the abutment surfaces 22a, 22b, which surfaces are forced apart by the male part 19 being inserted between them as it moves perpendicular to its axis.

The aperture 20 includes an end 24 forming an end-of-stroke abutment for the male part 19 limiting the amplitude of the movement of the leg 5 relative to the base 1. Said end 24 is formed by a semi-circular abutment surface which interconnects the respective ends of the abutment surfaces 22a and 22b. At the end of its stroke, the male part 19 abuts against said end 24. As a result, the amplitude of the forward pivoting movement of the leg 5 relative to the base 1 during energy absorption is limited.

In accordance with the invention, the cylindrical bore 23 is a through bore, and the male part 19 passes through the bore 23. The male part 19 includes a threaded end 25 for fixing the male part to a tapped bore 26 in the base 1 or in the leg 5, and a clamping head 27 for clamping the female part 21 between said head 27 and the base 1 or the leg 5. In this way, the male part 19 also constitutes a fixing screw for fixing the female part 21 to the base 1 or to the leg 5. And the male part 19 is fixed and secured to the leg 5 or to the base 1. Naturally, the female part 21 being fixed relative to the base 1 or relative to the leg 5 by the male part 19 does not prevent the relative motion of the male part 19 relative to the aperture 20 in the female part 21.

In accordance with the invention, the male part 19 includes an outer ring 28 whose circularly-cylindrical outer surface 29 co-operates with the abutment surfaces 22a, 22b of the slot forming the aperture 20 when the device 14 is active, and the outside diameter $\underline{d}$ of the male part 19 is the outside diameter of the outer surface 29. It is easy to modify the value of the outside diameter and therefore to modify both the trip threshold (i.e. said predetermined deceleration value) of the energy absorption device 14, and the quantity of energy absorbed when the male part 19 is displaced in the aperture 20, i.e. when the energy absorption device 14 becomes active. As a function of the use to be made of the underframe, an outer ring 28 having an appropriate outside diameter d can then be chosen.

Furthermore, the female part 21 is a plate made of a material having a high modulus of elasticity, in particular steel. In accordance with the invention, the plate is a plane plate, and the aperture 20 extends along a major axis 30 of symmetry of the plate. The shape and the dimensions given to the aperture 20 and to the abutment surfaces 22a, 22b in absolute terms and relative to the solid portions of the plate make it possible to vary the trip threshold and the absorbed energy capacity. For example, by varying merely the thickness of the plate constituting the female part 21, the absorbed energy capacity is caused to vary. Likewise, it is possible to act on the width $\underline{e}$ of the slot of the aperture 20 and/or on the widths of the solid portions on either side of the aperture 20.

In accordance with the invention, the female part 21 is associated with the leg 5 or with the base 1 by means of a screw 31 passing through a through bore 32 in the female part 21, and having its threaded end co-operating with a tapped hole 33 in the leg 5 or in the base 1.

In the embodiment shown, the female part 21 is associated with and secured to the leg 5 by the screw 31, and the male part 19 is associated with and secured to the base 1 via the bore 23 in the female part 21. The plate constituting the female part 21 extends rearwards between the leg 5 and the base 1. In the event that the seat is subjected to deceleration above a predetermined value tending to pivot the leg 5 forwards, the female part 21 secured to the leg 5 is driven therewith and the male part 19 penetrates into the slot in the aperture 20 between the abutment surfaces 22a, 22b. In addition, the female part 21 is also subjected to a small amount of bending in the vicinity of the point at which it is fixed by the screw 31 to the leg 5, as shown in FIG. 2.

Figure 2:
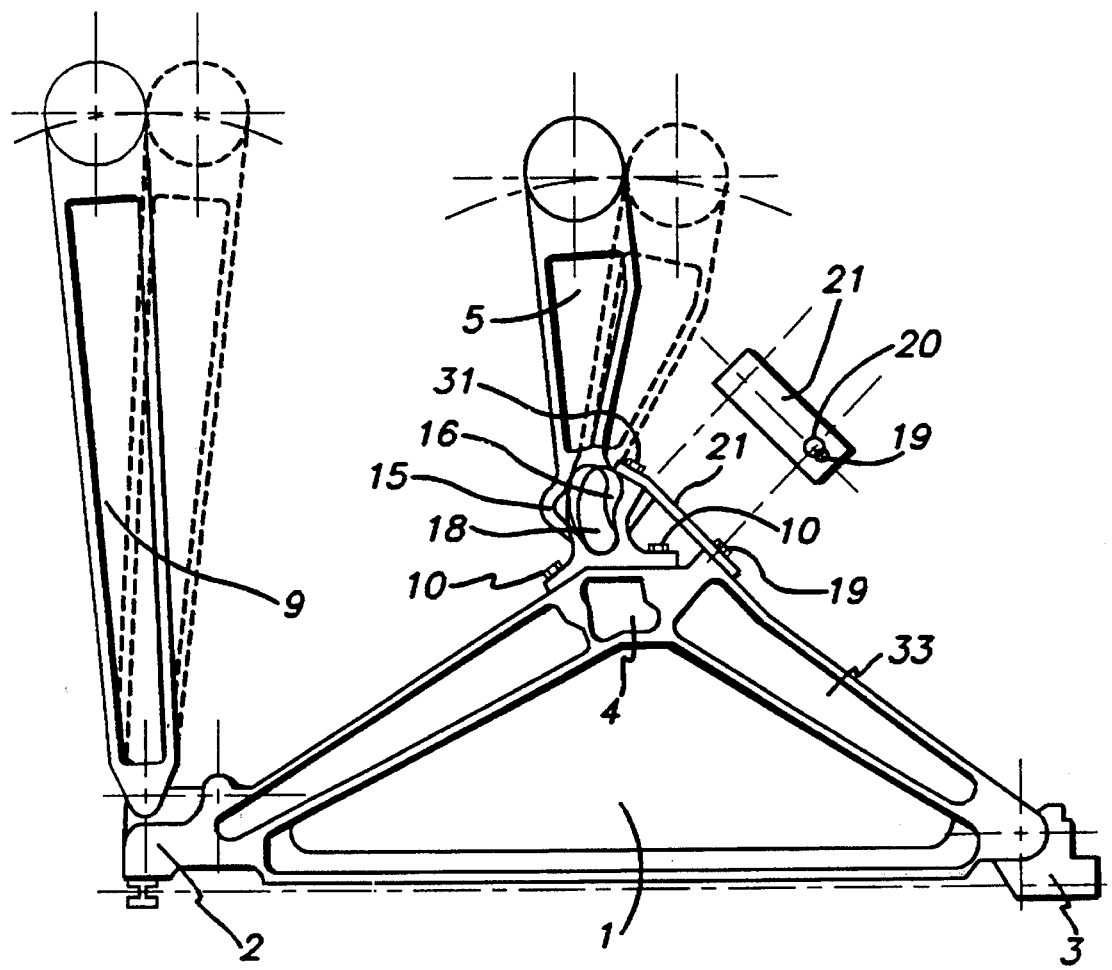
FIG. 2 is a diagrammatic side view of the FIG. 1 underframe during a crash.
Figure 4:
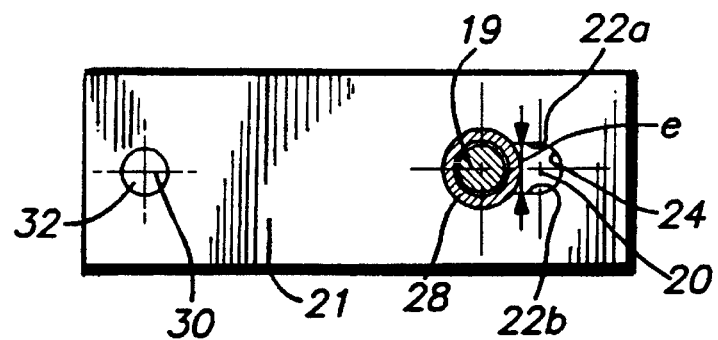
FIG. 4 is a view on line IV—IV of FIG. 3.
Figure 3:
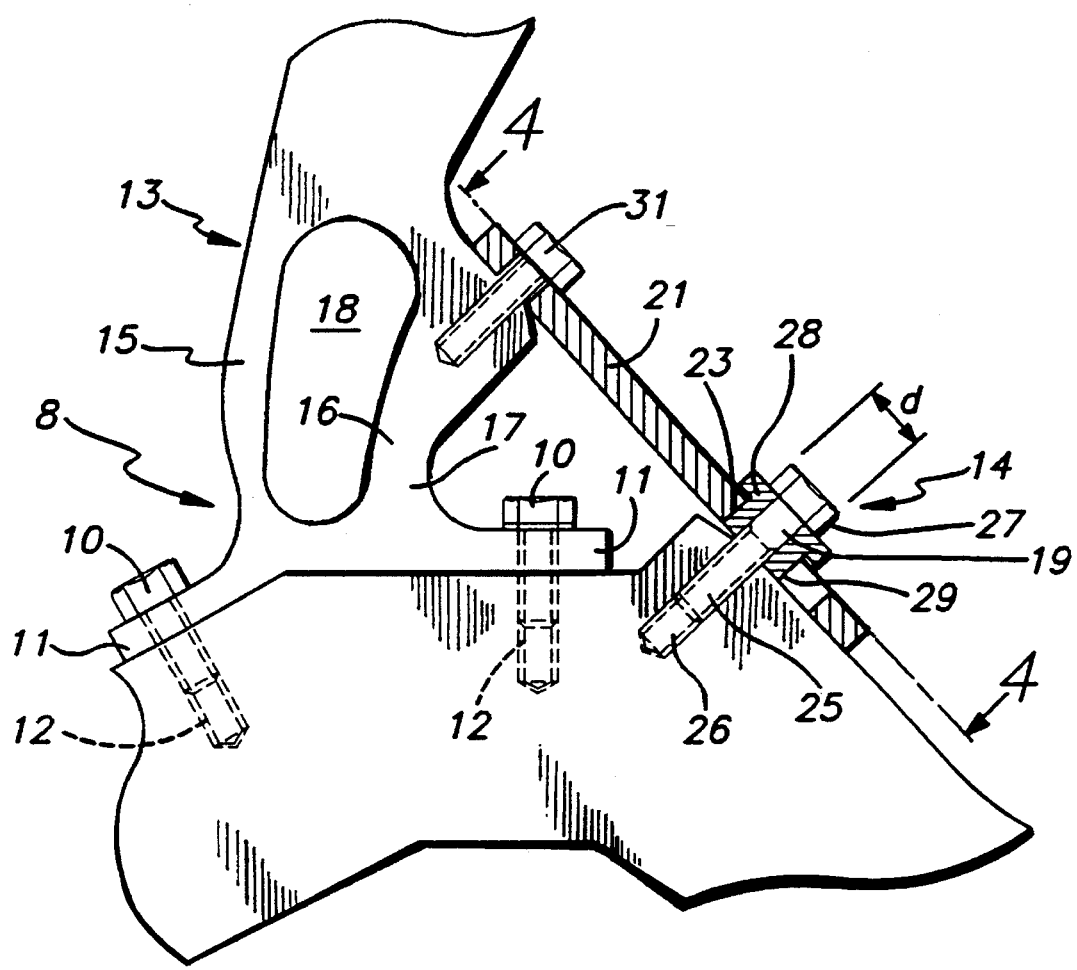
FIG. 3 is a diagrammatic detail view of the association between the leg and the triangular base of a seat underframe of the invention.

As shown in FIG. 1, the plane plate constituting the female part 21 extends at least substantially in the same direction as the rear arm 33 of the triangular base 1, and the axis of the male part 19 extends at least perpendicularly to that direction.

The shape characteristics and the dimension characteristics of the energy absorption means 13, 14 may be determined, for example, by calculation performed by a person skilled in the art of structures so as to obtain the desired values for the trip threshold and for the energy absorption capacity.

I claim:

1. An underframe for a passenger aircraft seat, the underframe including:

a triangular base defining a front anchor point and a rear anchor point, and a raised intermediate vertex, the triangular base being rigid in compression when the seat is subjected to deceleration above a predetermined value;

a leg having a top end connected to the structure of the seat, and a bottom end connected to the triangular base; and connection means of the bottom end of the leg with the triangular base;

wherein the connection means are arranged to connect rigidly the leg with the base during normal use of the seat, so as to hold the leg positively relative to the base, as to prevent any forward or backward pivoting of the leg;

the connection means being located between the leg and the triangular base;

and wherein the rigid connection means for rigidly connecting the leg with the base include energy absorption means which are active when the seat is subjected to deceleration above the predetermined value tending to cause the leg to pivot forward.

2. A seat underframe according to claim 1, wherein the energy absorption means include a rear portion that is plastically deformable by bending, and a front portion that is deformable by buckling.

3. A seat underframe according to claim 1, wherein the energy absorption means include at least one plastically deformable portion of the leg, which portion is plastically deformable above a predetermined deceleration value.

4. A seat underframe according to claim 1, wherein the energy absorption means include at least one plastically deformable portion of the bottom end of the leg.

5. A seat underframe according to claim 1, wherein the energy absorption means include an energy absorption device for absorbing energy by buckling, the device being formed of at least one portion of the leg.

6. A seat underframe according to claim 2, wherein said rear portion is provided with a narrow segment that is plastically deformable by bending, and that forms a transverse horizontal pivot axis about which the leg pivots relative to the base when said predetermined deceleration value is exceeded.

7. A seat underframe according to claim 2, wherein, to form the front and rear portions, the leg is provided with a transverse window provided at least in the vicinity of the connection between the leg and the base.

8. A seat underframe according to claim 2, wherein said front portion is constituted by a forwardly-convex member.

9. A seat underframe according to claim 2, wherein said rear portion is constituted by a forwardly-convex member.

10. A seat underframe according to claim 1, wherein the energy absorption means include an additional energy absorption device attached to, and interposed between the leg and the base.

11. A seat underframe according to claim 10, wherein the additional energy absorption device is attached at the rear and in the vicinity of the bottom end of the leg.

12. A seat underframe according to claim 10, wherein the additional energy absorption device includes a male part that penetrates by force and with plastic deformation into an aperture in a female part, wherein the female part or the male part is directly attached to the leg, and wherein the other part, i.e. the male part or the female part, is directly attached to the base.

13. A seat underframe according to claim 12, wherein the female part is connected with the leg or with the base by means of a screw passing through a through bore in the female part.

14. A seat underframe according to claim 12, wherein the male part has an overall external shape that is circularly cylindrical, wherein the aperture is constituted by an oblong slot forming two facing abutment surfaces radially extending a cylindrical bore in which the male part is normally engaged, and wherein the outside diameter of the male part is greater than the width of the oblong slot forming the aperture, so that, in action, the energy absorption device absorbs energy by means of plastic deformation of the abutment surfaces, which surfaces are forced apart by the male part being inserted between them.

15. A seat underframe according to claim 12, wherein the aperture includes an end forming an end-of-stroke abutment for the male part limiting the amplitude of the movement of the leg relative to the base.

16. A seat under frame according to claim 14, wherein the cylindrical bore is a through bore, and wherein the male part passes through the bore and includes a threaded end for fixing the male part to a tapped bore in the base or in the leg, and a clamping head for clamping the female part between said head and the base or the leg.

17. A seat underframe according to claim 14, wherein the male part includes an outer ring whose circularly-cylindrical outer surface co-operates with the abutment surfaces of the slot when the device is active.

18. A seat underframe according to claim 12, wherein the female part is a plate made of a material having a high modulus of elasticity, in particular steel.

19. A seat underframe according to claim 18, wherein the female part is a flat plate.

20. A seat underframe according to claim 18, wherein the aperture extends along an axis of symmetry of the plate.

* * * * *